Patented June 21, 1932

1,863,834

UNITED STATES PATENT OFFICE

COLE COOLIDGE AND HAROLD S. HOLT, OF WILMINGTON, DELAWARE, ASSIGNORS TO E. I. DU PONT DE NEMOURS & COMPANY, OF WILMINGTON, DELAWARE, A CORPORATION OF DELAWARE

NONCAKING PIGMENTED COATING COMPOSITIONS AND PROCESS OF MAKING SAME

No Drawing.   Application filed May 18, 1928.   Serial No. 278,909.

This invention relates to the art of making noncaking, pigmented coating compositions, and more particularly to a process of providing protective coatings or depositions on pigment particles, in order to prevent caking of the pigment in various coating compositions, and the invention also relates to the products of such processes.

It is desirable first to comment briefly upon the behavior of certain pigments in prior art coating compositions in regard to the phenomenon known as "caking." As pigmented coating compositions have been ordinarily prepared, the pigments have been distributed or dispersed in the coating compositions by various means to a degree satisfactory from a practical standpoint, as far as the immediate condition of the composition is concerned, but, after standing for a period of time, such compositions have exhibited a tendency for the sedimentation of the pigment, this process or phenomenon developing eventually to the point where the pigment became massed and tough with the aging of the composition, so that finally a hardness and dryness of the pigment took place, which made it very difficult to reincorporate the pigment in the composition to the same condition of dispersion that had originally existed. In some cases the cake so formed could be redispersed to a degree where the composition would be in condition for use, but this operation required expenditure of energy and time, and as a rule it was difficult to attain the original degree of dispersion without resorting to regrinding.

Experience has shown that frequently a comparatively large percentage of the pigment could not readily be redispersed owing to an insufficient degree of stirring, with a resulting quality unsatisfactory to the consumer. A decreased quality resulted in that the covering power was decreased, lumpy particles were present in the film, and off-tints in the case of light colors were encountered. Such a condition existing in paint type products represented definitely undesirable qualities, while in low viscosity lacquer type products, such as brush lacquers, etc., it has constituted a serious and objectionable feature. The tendency to hard-cake in the manner set forth varies with the pigment and also with the vehicle. It has been found that in certain instances it is possible to select for a given vehicle certain pigments which do not hard-cake to an extreme degree in the normal life of a shelf product, but this is not always a matter of free choice, as it is often necessary to use pigments with definite hard-caking tendencies in order to obtain certain necessary or desirable characteristics in the final products. Such a case may be illustrated by the more highly pigmented lacquers, such as whites and light shades, the latter representing tinted white in most cases. The combination of high density pigment or a pigment of an abnormal hard-caking tendency, with a low viscosity nitrocellulose vehicle, represents a system which frequently develops a maximum in hard-caking, this objectionable property being produced to a degree which is worse than in most enamel and paint products of the prior art. The importance of hiding power, the highly uniform surface character, and the necessity for close matches in tint render the off-quality characteristics imparted by hard-caking particularly serious in the case of lacquer type products.

On the other hand, some paint and lacquer compositions do not develop hard-caking owing to the peculiar nature of the systems involved, but nevertheless this hard-caking phenomenon has been frequently experienced in many kinds of prior art formulations for paints, lacquers, enamels, etc.

It will be clear from this discussion that we are not discussing a mere sedimentation or temporary deposition of pigment particles that can be easily remedied by stirring, but we are rather referring to a result of deposition or settling of particles which results in the formation of a hard cake that is most difficult to reincorporate with the vehicle and which, generally speaking, exhibits the characteristics of toughness, hardness, and resistance to stirring and reincorporation in the vehicle.

It is an object of the present invention to obviate the difficulties hereinbefore referred to by preventing the formation of the so-called "hard cake" by a suitable manufacturing process wherein the system will be so conditioned that the hard cake will not form, even though some sedimentation or deposit of pigment may occur. It is a further object of the invention to prevent such a hard cake from forming in various types of lacquers, enamels, and coating compositions wherein there is what may be termed a normal tendency to cake under the specific conditions of manufacture and the constitution of the composition. It is a still further object to employ various reagents in effecting this purpose and to devise various modes of procedure in connection with such reagents or agents, so that general methods may be devised for treating various types of compositions to avoid the formation of the so-called "hard cake". Further objects of this invention will appear as the following specification proceeds and the various specific examples are set forth.

"Titanox" as referred to in this specification will be understood by persons skilled in the art to be a pigment containing titanium dioxide and barium or calcium sulphate in approximately the proportion of 25% titanium dioxide and 75% metal sulphate.

As we have just indicated, the purpose is to devise general methods, and it will accordingly be seen that various embodiments of the invention will result within the spirit and scope of the claims, but, by way of a preferred embodiment, which we submit for illustrative purposes, we give the following procedure for preventing so-called "hard-caking" in the case of a Titanox pigment to be incorporated in a nitrocellulose lacquer coating composition.

Example I

The following constituents are thoroughly mixed together:

| | Parts by weight |
|---|---|
| 5% solution of rubber in gasoline | 11 |
| Ethyl alcohol | 6.1 |
| Butyl acetate | 1.3 |
| Toluol | 2.3 |
| Damar gum | 6.1 |

The "Titanox" pigment is then added in the proportion of 55 parts, mixed until uniformly incorporated, and the whole is then ground in a pebble mill for 12 hours. Let us call this mixture base "A".

The remaining constituents are mixed in a separate container as follows:

| | Parts by weight |
|---|---|
| Butyl acetate | 16 |
| Ethyl ether of ethylene glycol (cellosolve) | 10 |
| Butyl alcohol | 10 |
| Ethyl alcohol | 7.9 |
| Gasoline | 3.4 |
| Toluol | 4.2 |
| Damar gum | 3.9 |
| Nitrocellulose (½ second viscosity characteristic) | 10 |
| Dibutyl phthalate | 4 |

Let us call this lacquer admixture base "B".

Base "A" is then run into base "B" with efficient agitation, following which the lacquer is adjusted to suitable brushing viscosity with butyl acetate.

Modifications of Example I

The pigment may be thoroughly mixed with the gasoline solution of rubber, prior to addition of the remainder of the grinding vehicle. Any suitable rubber solvent system may be used in place of gasoline, and, if necessary, the solvent may be partially or completely removed by filtration or evaporation before incorporation with the grinding constituents. Another method consists in incorporating the pigment with the grinding vehicle before the rubber solution is added. Another method consists in adding the rubber solution at some stage of the grinding operation. A still further modification consists in incorporating the rubber solution by mixing it into the grinding base following the grinding operation. Another modification consists in the dry milling of the pigment with the protective agent without the use of any diluent or solvent for the agent, and this will be followed by incorporation of the grinding constituents.

Example II

The rubber may also be incorporated with the pigment prior to contact with any constituents of the lacquer vehicle, as follows: The pigment is slurried in water in the ratio of 3 parts of water to 1 of "Titanox", and there is added with strong agitation a small amount of an aqueous solution of rubber latex; ½% to 1% of rubber by weight on the basis of the pigment will usually suffice. The mixture is agitated thoroughly to allow for uniform adsorption or incorporation of the rubber on the pigment. The pigment is then filtered, dried, and used in the normal manner in the preparation of a nitrocellulose lacquer, as in Example I above.

Example III

The pigment is first mixed with a naphtha dispersion of stearine pitch to produce a uniform paste containing:

|  | Parts by weight |
|---|---|
| Naphtha | 10.5 |
| Stearine pitch | 0.55 |
| Butyl acetate | 1.3 |
| "Titanox" | 55.0 |

To this paste, in which the agent has been associated with the pigment, are added:

|  | Parts by weight |
|---|---|
| Ethyl alcohol | 6.1 |
| Damar gum | 6.1 |
| Toluol | 2.3 |

The mixture is transferred to a pebble mill and ground for 12 hours, following which it is formulated into a lacquer by the procedure outlined in Example I. The modifications recited in Example I may be, in analogous manner, employed here.

Example IV

This example relates to a gloss exterior paint. In this case, the total pigment is mixed with a portion of the vehicle and thinner containing all of the protective agent required to give the definite desired percentage of agent on the basis of the pigment. The following constituents are mixed thoroughly in a paint mixing device of the type used for heavy pastes: Bodied drying oil, 20 parts by weight. (This comprises 85% linseed oil, 14.7% Chinawood oil, and .3% drier.) There is also added 10% rubber solution in mineral spirits, 2 parts by weight, and also mineral spirits, 8.2 parts by weight, making a total of 30.2. (A rubber solution is made by taking 10 parts of milled or unmilled pale crepe rubber and swelling and solvating in 90 parts by weight of mineral spirits.)

The pigment is then slowly added, with thorough mixing, until all has been incorporated, namely, 40 parts of "Titanox". Mixing is continued until the paste is uniform, when it is subjected to grinding in a buhrstone mill or other device for dispersing pigments. The amount of oil and mineral spirits to be used will be governed to some extent by the consistency of the paste before grinding and this in turn by the type of mill to be used for grinding. The finished paint is prepared by mixing into the base the following:

|  | Parts by weight |
|---|---|
| Drying oil | 20 |
| Mineral spirits | 10 |

A paint so treated will be superior to the ordinary product in respect to the hard-caking referred to above, as the latter objection will not be present.

Example V

This deals with treatment of flat wall paint to prevent hard-caking. The vehicle constituents are thoroughly mixed in a heavy paste mixer, the constituents being:

|  | Parts by weight |
|---|---|
| Limed rosin, Chinawood oil, or linseed varnish | 10.8 |
| Mineral spirits | 3.36 |

The protective agent, rubber, in the form of a 10% solution in mineral spirits is then added in small proportions to the paint mixer following each addition of pigment with mixing until the total amount of each has been uniformly incorporated. Thus:

|  | Parts by weight |
|---|---|
| 10% rubber solution in mineral spirits | 7.2 |
| Lithopone | 61.5 |
| Magnesium silicate | 11.0 |

If the pigment-filler combination were added in ten portions of 7.25 parts each, the agent solution would be added in ten portions of .72 parts each. The addition of the agent solution would in each case precede the pigment addition. Following grinding in a buhrstone or other suitable grinding mill, the finished paint is produced by mixing in 6.14 parts mineral spirits.

Example VI

This represents treatment of a gloss exterior paint. Boiled drying oil, comprising 85% linseed oil, 14.7 Chinawood oil, and .3% dried, is taken 20 parts by weight; mineral spirits, 10 parts by weight; sulfonated tallow, .2 parts by weight, making a total of 30.2. (The said tallow may be partially neutralized with ammonia or other alkali or alkaline earth metal.) The pigment, consisting of 40 parts "Titanox", is then slowly added, with thorough mixing, until all has been uniformly incorporated. It is then ground, and thereafter the base is reduced with drying oil, 20 parts; mineral spirits 10 parts. Sulfonated cod oil may be used in place of the tallow.

Example VII

This represents treatment of a pigment with a protective agent in a water slurry prior to incorporation with a paint vehicle. 1000 parts of "Titanox" by weight are treated with water to produce a 1:2 slurry of pigment to water, and 250 parts by weight of aqueous pectin solution (4% by weight) are added to the slurry (equivalent to 1% of pectin on the pigment). After vigorous agitation for 30 minutes, the water is evaporated and the sludge dried at 105° C. for 18 hours. The dry, caked, pectin-treated pigment is ground on a disintegrator and used in formulating a paint of the following composition:

The grinding base is composed of:

| | Parts by weight |
|---|---|
| Pectin-treated "Titanox" bodied oil | 57.14 |
| 85% linseed oil<br>14.7% Chinawood oil<br>0.3% drier | 28.57 |
| Mineral spirits | 14.29 |

After the grinding on a buhrstone mill, the base is reduced as follows:

| | Parts by weight |
|---|---|
| Above mill base | 70 |
| Bodied oil | 19.04 |
| Mineral spirits | 10.96 |

This completes the operation.

In the foregoing examples we have devised procedures and formulations, as a result of which the pigment is incorporated in the vehicle or composition in such a manner that caking is prevented, and thereby the aforesaid objects of the invention have been attained. As may be ascertained from the examples, this caking is prevented by employing an agent in one form or another, in such a manner as to deposit it or coat it upon the pigment particles so that the pigment will be put into a condition where it will not cake together to form a tough, hard mass that would resist an attempt to stir it or disperse it again into the vehicle, but it is rather in such a condition that, even though it might be inclined to settle sediment or deposit, it would not form a hard cake but could readily be reincorporated in the vehicle or composition by a reasonable amount of stirring or suitable agitation. The said deposition of the agent upon the pigment particle has the effect of separating the particles and thereby avoiding caking.

As will be seen from the examples offered by us, this agent, which we may call a protective agent, may be applied in various modes and ways, depending on circumstances, and the agent itself may be different in various cases. In some cases, the agent will be a colloidal material; that is, it may be deposited on the pigment particle from a colloidal dispersion, such as in the case of the rubber solution described above. The various modifications in which our invention may be carried out will be further discussed in the following paragraphs.

As regards the protective agent itself, we have employed a large number of them, as herein recited. For nitrocellulose lacquers we may use the following: Rubber latex and sodium caseinate, which may be employed in a water medium; rubber, either milled or raw, which may be employed in a gasoline, benzene, or other solvent medium; citric, tartaric, propionic acids, or gelatine, with glycerin, which may be employed in alcohol-toluol media; stearine pitch, in naphtha or gasoline media; balata, silver stearate, tannic acid, hydrocarbon of gutta percha, in a gasoline medium; a substance known as Thermoprene SL and GP, comprising rubber heated with organic sulfonyl chloride or organic sulfonic acid, in a gasoline medium. These will illustrate how various protective agents may be dispersed in proper media, so that they may be deposited upon the pigment particles to be treated.

In the case of oil and varnish vehicles, the following protective agents and corresponding media may be employed: Rubber latex, pectin, sulfonated castor oil partially neutralized with ammonia, and Turkey red oil may be employed in a water medium. Rubber may be employed in a gasoline medium. Pectin may also be employed in a gasoline medium in a paint vehicle, etc. Stearine pitch may be employed in a gasoline-naphtha medium. There may also be used sulfonated tallow, sulfonated cod oil, sulfonated petroleum fractions, sulfonated castor oil (if desired, they may be partially neutralized with ammonia or other alkalis), and these may be emulsified with or dissolved in gasoline or in the paint vehicle as a proper medium. Colloidal wax may also be used, and in this case the medium will be gasoline (the composition of the wax being carnauba, 1.6%, and paraffin, 7.9%; gasoline, 90.5%.

In the case of compositions to be used as undercoats for metal, such as modified glyptal resin vehicles, there may be used as protective agents rubber dispersed in gasoline containing naphtha; and stearine pitch in a similar medium. Various other protective agents and media may be employed.

In regard to the pigments that may be treated to prevent hard-caking, we find that the methods are applicable to a large variety of pigments, such as "Titanox", lithopone, titanium oxide, iron oxide, barium sulphate, chrome green, whiting, basic carbonate white lead, or admixtures of the same, or other pigments or fillers. As illustrated by the foregoing examples, the specific formulation and mode of deposition of the protective agent on the pigment will vary with the particular circumstances, no two cases being exactly alike, but the foregoing examples will indicate how the protective agent should be dispersed in a suitable medium and in what manner the deposition may be accomplished so as to prevent the hard-caking, various types of procedures being given for purposes of illustration, the principle being substantially the same throughout these various embodiments of our invention.

Referring again to the protective agent, we have stated that the purpose of this agent is to deposit upon or coat the pigment particles in such a manner as to prevent the hard-caking referred to. It will be evident that no particular protective agent must be used nor must any particular mode of procedure be employed, except as indicated by the particular type of lacquer, paint, enamel, or vehicle to be manufactured and the general character of its constituents. We would like, however, to indicate a short method of determining what type of protective agent should be used in a given case. The protective agent under examination may first be dispersed or dissolved in all or a portion of one of the constituents of the vehicle, after which the pigment is incorporated with this dispersion. The portion of the vehicle chosen as a solvent or dispersion medium should preferably be one simple liquid or a mixture of such, containing no substance which might inhibit adsorption or deposition of the protective agent on the pigment. The agent will be used in quantity to form a film, let us say, of at least molecular dimensions on the pigment particles. The agent is incorporated with the pigment by thorough mixing and agitation of the pasty mass, whereby all pigment particles are brought into intimate contact with the protective agent. In certain systems of necessarily heavy consistency, it may be desirable to substitute for this mixing operation a grinding procedure. The remainder of the vehicle is then added and the whole thoroughly mixed. A paint, enamel, or lacquer prepared in the above manner, without grinding, would exhibit rather poor pigment dispersion, yet it lends itself to the determination of protection against hard-caking.

The protective agent may be milled with the pigment directly, as referred to earlier in this specification, and procedures in suitable cases may be modified to proceed in this manner. Lithopone may be first treated with para soap as a protective agent whereby the lithopone will be subsequently suitably dispersed in the proper paint or enamel vehicle.

The product prepared as above outlined is compared directly with a control sample prepared in exactly the same way, but containing no protective agent. Small samples of the products are stored at both elevated and room temperature and examined periodically for hard-caking of the pigment. Whereas the untreated pigment sooner or later settles into a hard, dry cake, redispersed only with difficulty, the pigment treated with an effective protective agent settles into a soft, loose cake which is easily redispersed. In this manner the effectiveness of a particular agent under examination may be determined, and its mode of application would of course be guided by the foregoing examples.

In referring to lacquers having a nitrocellulose base, we desire to state that other cellulose esters, such as cellulose acetate or acetyl cellulose, may be employed, and also cellulose derivatives, such as cellulose ethers, etc., all of which we designate under the general heading of cellulosic materials or substances.

The term "titanium oxide pigment particles" as used in the claims is intended to include pigments containing titanium oxide whether alone, in physical admixture with other pigments, or in chemical combination, and the term "rubber" as used in the claims is intended to include not only what is technically known as rubber but also the rubber like products known as Thermoprene SL and GP obtained by heating rubber with organic sulfonyl chloride or organic sulfonic acid in a gasoline medium.

As many apparently widely different embodiments of this invention may be made without departing from the spirit thereof, it is to be understood that the invention is not to be limited to the foregoing examples or description, except as indicated in the following patent claims.

We claim:

1. The process of preparing a non-caking pigmented lacquer having a cellulosic base, which comprises mixing the pigment with a rubber solution; adding thereto a solvent mixture with a gum; grinding the pigment in the mixture; preparing a composite mixture containing a cellulosic material and an ester, a gum, and a solvent; running the pigmented mixture into the latter solution and adjusting the mixture to brushing viscosity with a solvent.

2. The process of preparing a non-caking titanium oxide pigmented lacquer having a nitrocellulose base, which comprises mixing the pigment with a gasoline solution of rubber; adding thereto a solvent mixture with damar gum and grinding the pigment in said solvent mixture; preparing a nitrocellulose base solution in a composite mixture containing butyl acetate, alcohol, gum damar, and dibutyl phthalate; running the pigmented mixture into the nitrocellulose solution with agitation; adjusting to brushing viscosity with butyl acetate.

3. In a process of preparing a non-caking pigmented coating composition, the step which consists in agitating the pigment particles in a rubber dispersion in a liquid.

4. A nitrocellulose lacquer containing a pigment whose particles have deposited upon their surfaces a rubber composition which serves as a protective agent.

5. A nitrocellulose lacquer containing a titanium oxide pigment whose particles are provided with a deposit of rubber to act as a protective agent against caking, said lacquer containing butyl acetate, a gum, and a softener, the pigment being ground in the mixture and the latter being adjusted to brushing viscosity.

6. A non-caking pigmented coating composition containing pigment particles having a film on their surfaces of a protective agent from the group consisting of rubber, rubber latex, balata and gutta percha.

7. A non-caking pigmented coating composition containing titanium oxide pigment particles having a film on their surfaces of a protective agent from the group consisting of rubber, rubber latex, balata and gutta percha.

8. A non-caking pigmented coating composition containing pigment particles having a film on their surfaces of a protective agent from the group consisting of rubber and rubber latex.

9. A non-caking pigmented coating composition containing titanium oxide pigment particles having a film on their surfaces of a protective agent from the group consisting of rubber and rubber latex.

10. A non-caking pigmented coating composition containing a cellulosic film forming material and pigment particles having a film on their surfaces of a protective agent from the group consisting of rubber, rubber latex, balata and gutta percha.

11. A non-caking pigmented coating composition containing a cellulosic film forming material and titanium oxide pigment particles having a film on their surfaces of a protective agent from the group consisting of rubber, rubber latex, balata and gutta percha.

12. A non-caking pigmented coating composition containing a cellulosic film forming material and pigment particles having a film on their surfaces of a protective agent from the group consisting of rubber and rubber latex.

13. A non-caking pigmented coating composition containing a cellulosic film forming material and titanium oxide pigment particles having a film on their surfaces of a protective agent from the group consisting of rubber and rubber latex.

14. A non-caking pigmented coating composition containing an oil film forming ingredient and pigment particles having a film on their surfaces of a protective agent from the group consisting of rubber and rubber latex.

15. A non-caking pigmented coating composition containing an oil film forming ingredient and titanium oxide pigment particles having a film on their surfaces of a protective agent from the group consisting of rubber and rubber latex.

16. A non-caking pigmented coating composition containing a polyhydric alcohol-polybasic acid resin film forming material and pigment particles having a film on their surfaces of a protective agent from the group consisting of rubber and rubber latex.

17. A non-caking pigmented coating composition containing a polyhydric alcohol-polybasic acid resin film forming material and titanium oxide pigment particles having a film on their surfaces of a protective agent from the group consisting of rubber and rubber latex.

In testimony whereof we affix our signatures.

COLE COOLIDGE.
HAROLD S. HOLT.

Certificate of Correction

Patent No. 1,863,834.

June 21, 1932.

COLE COOLIDGE ET AL.

It is hereby certified that error appears in the printed specification of the above-numbered patent requiring correction as follows: Page 4, strike out lines 3 to 7 comprising the table and insert instead the following:—

| | Parts by weight |
|---|---|
| Pectin-treated " Titanox " | 57.14 |
| Bodied oil<br>  85% linseed oil<br>  14.7% Chinawood oil.<br>  0.3% drier | 28.57 |
| Mineral spirits | 14.29 |

Line 94, at the end of the line insert a parenthesis; and that the said Letters Patent should be read with these corrections therein that the same may conform to the record of the case in the Patent Office.

Signed and sealed this 16th day of August, A. D. 1932.

[SEAL.]

M. J. MOORE,
*Acting Commissioner of Patents.*